(12) United States Patent
Aratow et al.

(10) Patent No.: US 6,199,008 B1
(45) Date of Patent: Mar. 6, 2001

(54) AVIATION, TERRAIN AND WEATHER DISPLAY SYSTEM

(75) Inventors: Michael Aratow, Mountain View; Robert S. Simon, San Francisco, both of CA (US)

(73) Assignee: Noegenesis, Inc., Moutain View, CA (US)

(*) Notice: Subject to any disclaimer, the term of this patent is extended or adjusted under 35 U.S.C. 154(b) by 0 days.

(21) Appl. No.: 09/282,047

(22) Filed: Mar. 29, 1999

Related U.S. Application Data
(60) Provisional application No. 60/100,777, filed on Sep. 17, 1998.

(51) Int. Cl.[7] .................................................. G06F 19/00
(52) U.S. Cl. ............................ 701/120; 701/14; 707/104
(58) Field of Search ..................... 701/14, 120; 707/101, 707/104; 340/971, 973; 702/3

(56) References Cited

U.S. PATENT DOCUMENTS

| | | | |
|---|---|---|---|
| 4,347,618 | 8/1982 | Kavouras et al. ..................... 375/37 |
| 4,521,857 | 6/1985 | Reynolds, III ...................... 364/439 |
| 4,807,158 | 2/1989 | Blanton et al. ..................... 364/521 |
| 4,827,419 | 5/1989 | Selby, III .......................... 364/443 |
| 5,111,400 | 5/1992 | Yoder ............................. 364/424.01 |
| 5,265,024 | 11/1993 | Crabill et al. ....................... 364/443 |
| 5,343,395 | 8/1994 | Watts ................................. 364/428 |
| 5,363,107 | 11/1994 | Gertz et al. ........................... 342/26 |
| 5,369,589 | 11/1994 | Steiner ............................... 364/449 |
| 5,379,215 | 1/1995 | Kruhoeffer et al. .................. 364/420 |
| 5,390,237 | 2/1995 | Hoffman, Jr. et al. ................. 379/67 |
| 5,432,895 | 7/1995 | Myers ................................ 395/119 |
| 5,490,239 | 2/1996 | Myers ................................ 395/129 |
| 5,517,193 | 5/1996 | Allison et al. .......................... 342/26 |
| 5,548,515 | 8/1996 | Pilley et al. .......................... 364/439 |
| 5,568,385 | 10/1996 | Shelton ............................... 364/420 |
| 5,583,972 | 12/1996 | Miller ................................. 395/119 |
| 5,675,746 | 10/1997 | Marshall ............................. 395/235 |
| 5,717,589 | 2/1998 | Thompson et al. .................. 364/420 |
| 6,021,374 | * 2/2000 | Wood ................................. 701/301 |

OTHER PUBLICATIONS

Free Flight—moving map for pilots; http://www.cse.vc-sc.edv/research/slvg/slug.html. No date.
Aviation Weather; wysiwyg://64/http://aviationweather.com, Mar. 10, 1998.

(List continued on next page.)

Primary Examiner—Michael J. Zanelli
(74) Attorney, Agent, or Firm—Flehr, Hohbach, Test, Albritton & Herbert, LLP; David C. Ashby

(57) ABSTRACT

A computer system for displaying terrain, weather and aviation information includes a terrain database, an aviation map database, a weather database, an air traffic database, an airplane specific database and a route database. A processor is coupled to the terrain database, the aviation map database, the weather database, the air traffic database, the airplane specific database and the route database and configured to determine a position and heading of an airplane over the terrain based on the route database, to compute terrain information, aviation map information, air traffic information and weather information relative to the airplane and to compute and display flight parameters associated with the airplane using the airplane specific database. Advantages of the invention include the ability to supply a pilot with information that he can use to visualize his flight and approach to the destination airport. This provides improved information to the pilot so that he can make his decision whether to make a flight. With this improved information, the pilot will make a safe and informed decision.

15 Claims, 15 Drawing Sheets

OTHER PUBLICATIONS

GTI Electronics Web Page; http://gtielect.ptd.net/index.html, Mar. 9, 1998.

NEXTweather; http://www.weatherconcepts.com, Mar. 9, 1998.

PC Weather Products,Inc.—HURRTRAK Em/Pro V2.0; http://www.pcwp.com/prod2.html,© 1992–1997.

Smith, B., "Frequently used contractions in National Weather Service products", complied from National Weather Service and Federal Aviation Administration sources, Jul. 24, 1995.

Main Frame in RIS Home Page; http://www.landform.com/frmain.htm, © 1995, 1996, 1997.

"National Weather Service METAR/TAF Information", METAR/TAF Overview, Jul. 1, 1996; Http://www.nws.noaa.gov/oso1/oso12/overview.htm.

George, F., Introducing Primus Epic, Business and Commercial Aviation, Nov. 1996, pp. 116–120.

Holahan, J., LCDs, Mice on the Flight Deck!, Aviation International News, Nov. 1, 1996, pp. 56–58.

Scott, W.B., Pentium Powers 'Epic' Integrated Avionics, Aviation Week & space Technology, Nov. 18, 1996, pp. 67–69.

Ditter, A., An Epic in the Making, Commuter World, Dec. 1996–Jan. 1997, pp. 16, 18–21.

\* cited by examiner

| | |
|---|---|
| USER INTERFACE SYSTEM — 40 | 42 |
| Initialization | 48 |
| User Input | 50 |
| User Output | 52 |
| DATABASE SYSTEM | 44 |
| Terrain | 54 |
| Map | 56 |
| Weather | 58 |
| Aircraft | 60 |
| Route | 62 |
| Air Traffic | 64 |
| User Specified | 66 |
| COMMUNICATION SYSTEM | 46 |
| NWS | 68 |
| FAA | 70 |
| NOAA | 72 |
| Commercial Vendor | 74 |
| Internet | 76 |
| Other | 78 |

FIG. 2

| | |
|---|---|
| Terrain Database | 54 |
| cell 1 lat, long, elevation | |
| cell 2 lat, long, elevation | |
| cell 3 lat, long, elevation | |
| cell 4 lat, long, elevation | |
| . . . . . . . . . . . | |

FIG. 3A

| Map Database | |
|---|---|
| uncontrolled airspace, location | |
| controlled, location | |
| airport, location | |
| runway | |
| orientation | |
| length | |
| pattern information | |
| obstacles | |
| hours of operation | |
| runway material | |
| navaid | |
| location | |
| type | |
| frequency | |
| NOTAMS | |
| effective date(s) | |
| effective time(s) | |
| location | |
| type | |
| object or location affected | |
| action on object or location | |
| regulation/procedure affected | |
| amendment to regulation/procedure | |
| Instrument Approaches/Departures | |
| initial approach fix(es) position (x,y,z) | |
| fixes(es) position (x,y,z) | |
| path (x,y,z) | |
| decision height/missed approach point | |
| aircraft category A,B,C,D | |
| minimums | |
| aircraft category A,B,C,D | |
| visibility | |
| ceiling | |
| alternate airports | |
| missed approach procedure | |
| path (x,y,z) | |
| fixes (x,y,z) | |
| holding pattern (x,y,z) | |

FIG. 3B

| Weather Database | |
|---|---|
| time | |
| sky condition, location | |
| visibility, location | |
| cloud base elevation, location | |
| wind speed and direction, location | |
| REPORT TYPES | |
|     HOURLY/SPECIAL WEATHER OBSERVATIONS (METAR) | |
|     TERMINAL AERODROME FORECASTS (TAF) | |
|     AVIATION AREA FORECASTS | |
|     WINDS ALOFT FORECASTS | |
|     RADAR REPORTS | |
|     PILOT REPORTS | |
|     SEVERE WEATHER FORECASTS | |
|     AIRMETS | |
|     SIGMETS | |

| | |
|---|---|
| Aircraft Database | 60 |
| Aircraft type A | 60a |
| takeoff performance | 60a-1 |
| distance | 60a-2 |
| speed | 60a-3 |
| landing performance | 60a-4 |
| ground roll | 60a-5 |
| max crosswind component | 60a-6 |
| cruise speed | 60a-7 |
| single engine | 60a-8 |
| multiengine | 60a-9 |
| service ceiling | 60a-10 |
| single engine | 60a-11 |
| multiengine | 60a-12 |
| rate of climb | 60a-13 |
| single engine | 60a-14 |
| multiengine | 60a-15 |
| angle of climb | 60a-16 |
| stall speed | 60a-17 |
| glide path | 60a-18 |
| speed | 60a-19 |
| distance | 60a-20 |
| fuel capacity | 60a-21 |
| current fuel amount | 60a-22 |
| fuel consumption | 60a-23 |
| current fuel consumption | 60a-24 |
| current weight | 60a-25 |
| maximum gross weight | 60a-26 |
| maximum takeoff weight | 60a-27 |
| maximum landing weight | 60a-28 |
| useful load | 60a-29 |
| moment | 60a-30 |
| position 1 | 60a-31 |
| weight | 60a-32 |
| . . . . . . . . . . | |
| Aircraft type B | 60b |
| . . . . . . . . . . | |
| Aircraft type C | 60c |
| . . . . . . . . . . | |

FIG. 3D

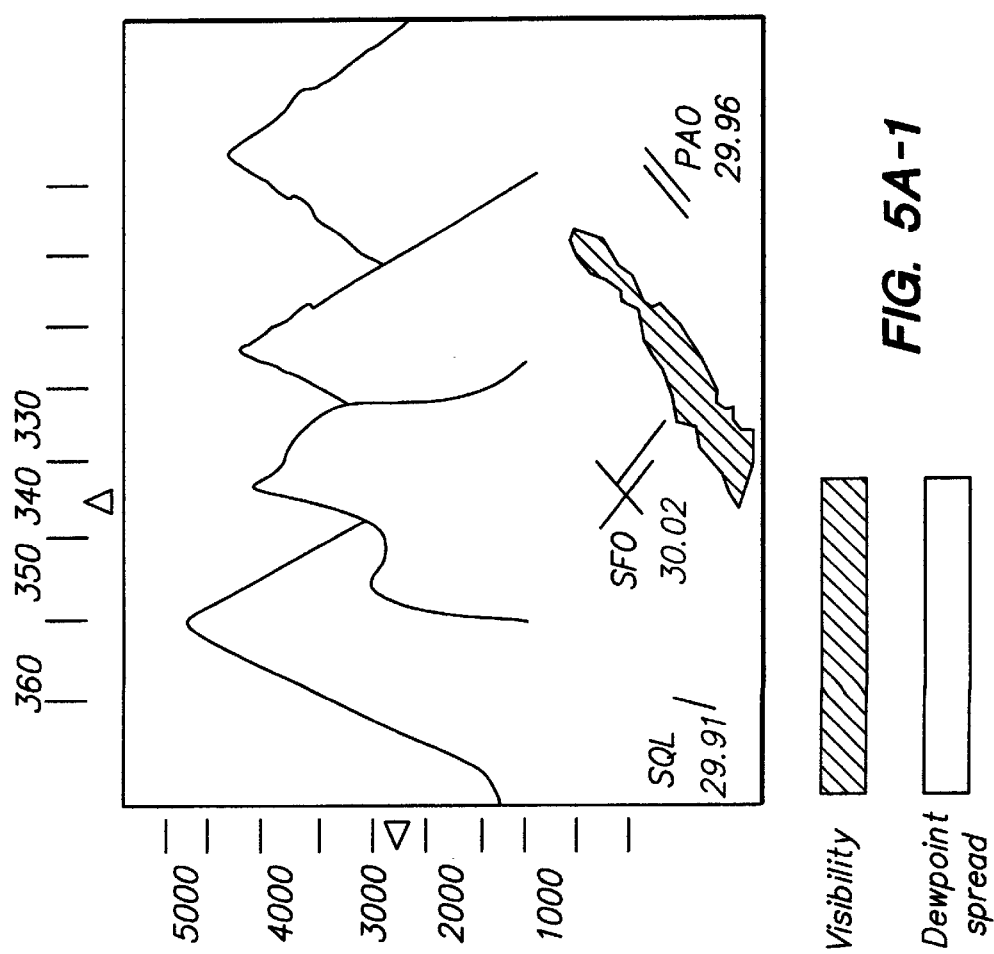

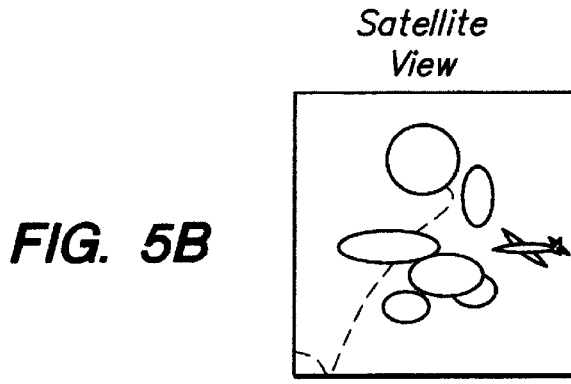
FIG. 5B
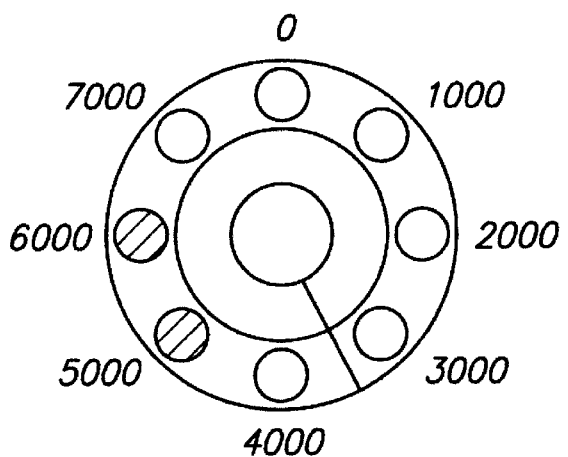
FIG. 5C
FIG. 5D
Cloud Coverage
- ◯ Clear
- ◐ 1/8ths
- ◕ Scattered
- ◑ 3/8ths
- ◐ 4/8ths
- ◕ 5/8ths
- ● Broken
- ◉ 7/8ths
- ● Overcast
- ⊗ Obscured
- Ⓜ Missing

WEATHER DATA RECEIVING AND TRANSLATING MODULE

Data From NWS, FAA, NOAA
    report
    location

Communication Interface Module

Translation Module
    type of report extraction, e.g., SA=surface observation
    location extraction, e.g., DFW=Dallas
    time stamp, e.g., 1320=7:20pm
    weather string extraction, e.g.,
        clouds
            5 BKN=broken cloud layer at 5000 ft
            10 OVC=overcast cloud layer at 10000ft
    visibility
    meteorological conditions Weather Database (time stamp)
    sky condition, location
    visibility, location
    cloud base elevation, location
    wind speed and direction, location

FIG. 7

NOTAM DATA RECEIVING AND TRANSLATING MODULE

Data From NATCOM, FAA
    report
    location
    time

↓

Communication Interface Module

↓

Translation Module type of NOTAM e.g., L, D, FDC
    location extraction, e.g., DFW=Dallas
    time extraction, e.g., valid 21June1999 0050Z - 22June1999 0040Z
    object extraction, e.g., taxiway alpha
    action extraction, e.g., closed, under construction

↓

Map Database (time stamp)
    affected airport, location
        geometry change
        or icon creation
    affected airspace, location
        geometry change
        or icon creation
    affected procedure, location
        geometry change
        or icon creation
    valid time

FIG. 8

AVIATION, TERRAIN AND WEATHER DISPLAY SYSTEM

REFERENCE TO RELATED APPLICATIONS

This application claims priority to Prov. Appl. No. 60/100,777 filed Sep. 17, 1998.

FIELD

The present invention relates to an aviation, terrain, air traffic and weather display system that provides information for preflight and inflight use by pilots. In particular, the invention uses a terrain database, an aviation map database, a weather database, an airplane specific database, an air traffic control database and a route database to display a flight path over a given terrain while combining weather data (e.g. wind and clouds), aviation map data (e.g. control zones and required minimum visibilities and ceilings), air traffic data (e.g. position and movement vectors) and real time and/or predicted performance data (e.g. climb rate, endurance) to allow increased situational awareness of the pilot and enhance display of possible dangerous conditions and prohibited procedures.

BACKGROUND

Pilots have long needed assistance in making decisions whether to fly given ambient weather conditions (the "go/no go decision"). If that decision is positive, they must then determine the safety of flying to a given destination airport or along a preplanned route. Presently, the National Weather Service (NWS), Federal Aviation Administration (FAA) and other government agencies assist pilots by providing sky data including wind direction and speed, weather conditions such as rain and other relevant data. Often this information is in cryptic form and is difficult for beginning pilots to understand. This information must then be applied in the context of a multitude of regulations and aircraft performance parameters, making this a formidable task. Moreover, experienced pilots still often find the information cryptic and find it difficult to retrieve and assimilate specific data relevant to their flight from the large amount available. Confounding the situation further, commercial flight operators have their own unique regulations and restrictions supplementing federal aviation regulations which must be recognized and adhered to by their pilots.

Some systems were developed to automate the delivery of weather information to pilots. For example, U.S. Pat. No. 5,265,024 describes a pilot's automated weather support system. The system receives weather information from a plurality of weather reporting organizations including the NWS, FAA and others. The system then converts the weather information into cross sections for preflight and inflight use. U.S. Pat. No. 5,432,895 describes a virtual reality imaging system. The system provides pilots with a representation of all the multidimensional space around an airport. This includes weather, air traffic and spatial relationships of the aircraft with respect to the airport and the ground level.

While these patents and other conventional products can provide some level of automation to the weather reporting, these systems do not take into account the special flight rules that are dictated for airports and airspace and specific flight parameters that are unique from one aircraft and one trip to the next.

What is needed is a system that combines information including weather, terrain, map, air traffic and airplane specific parameters to supply a pilot with information that he can use to visualize his departure, enroute segment and approach to the destination airport.

SUMMARY

The invention solves the identified problems by providing a computer system that displays terrain, weather, air traffic and aviation information. The invention provides pilots with information derived from a terrain database, an aviation map database, a weather database, an airplane specific database, an air traffic database and a route database. The system can display a flight path over a given terrain while combining aviation map data (e.g. approach paths and control zones), air traffic data (position, direction, speed and predicted path) and weather data (e.g. wind and clouds). Further, the system can employ the airplane specific information along with the terrain, map, weather, air traffic and route information to display whether the airplane parameters will allow departure (e.g. minimum visibility/ceilings violated), flight along the route or landing at a specific airport (e.g. crosswind component too large). If the pilot desires, the system can suggest alternate routes and alternate airports. Of course, the pilot makes the decision whether to accept the system's suggestions (many of whose parameters are controlled by the pilot) and whether to query the system to provide additional options.

Three important features of the system are the aviation map database, the airplane specific database and the air traffic database. The aviation map database provides flight information such as restricted airspace, location of airports, location of VORs, instrument approach/departure paths and other information. The aviation map database also provides information on airports such as runway lengths, runway elevations, runway orientation, alternate airports and other information. This information is very important for preflight and inflight planning.

The airplane specific database provides information on a specific aircraft such as runway length requirements, maximum crosswind component, fuel consumption, maximum climb speed and rate, object clearance, current speed and direction, outside air temperature and other information. This information is combined with information from the other databases to be used for preflight and inflight planning.

The air traffic database provides information on aircraft type, position, speed, direction and predicted position that are in the area of the designated flight. Combined with information from the other databases, this can be used for inflight planning and collision avoidance.

An exemplary embodiment of the system includes a terrain database, an aviation map database, a weather database, an airplane specific database, an air traffic database and a route database. A processor is coupled to the terrain database, the aviation map database, the weather database, the airplane specific database, an air traffic database and the route database and configured to determine a position and heading of an airplane over the terrain based on the route database, to compute and display terrain information, aviation map information, air traffic information and weather information relative to the airplane and to compute and display flight parameters associated with the airplane using the airplane specific database and the route database.

Advantages of the invention include the ability to supply a pilot with information that he can use to visualize his flight and approach to the destination airport. The pilot can also visualize which flying variables (e.g. required climb rate, wind speed/direction) are beyond the aircraft's capabilities or are prohibited by federal regulations (e.g. visibilities below minimums). This provides improved information to the pilot so that he can make his decision whether to make to flight or whether to choose his intended route or destination. With this improved information, the pilot will make safe and informed decisions about flying.

BRIEF DESCRIPTION OF THE FIGURES

Additional advantages of the invention will become apparent upon reading the following detailed description and upon reference to the drawings, in which:

FIG. 2 depicts a memory structure for storing program and data in the computer system of FIG. 1;

FIGS. 3A–F depict the database system of FIG. 2 in greater detail;

FIGS. 5A–I depict a user display interface according to an embodiment of the invention.

FIG. 7 depicts an aspect of the invention for retrieving and updating the weather database;

FIG. 8 depicts an aspect of the invention for retrieving and updating the map database with NOTAM data.

DETAILED DESCRIPTION

Exemplary embodiments are described with reference to specific configurations. Those skilled in the art will appreciate that various changes and modifications can be made while remaining within the scope of the claims.

Figure 1:
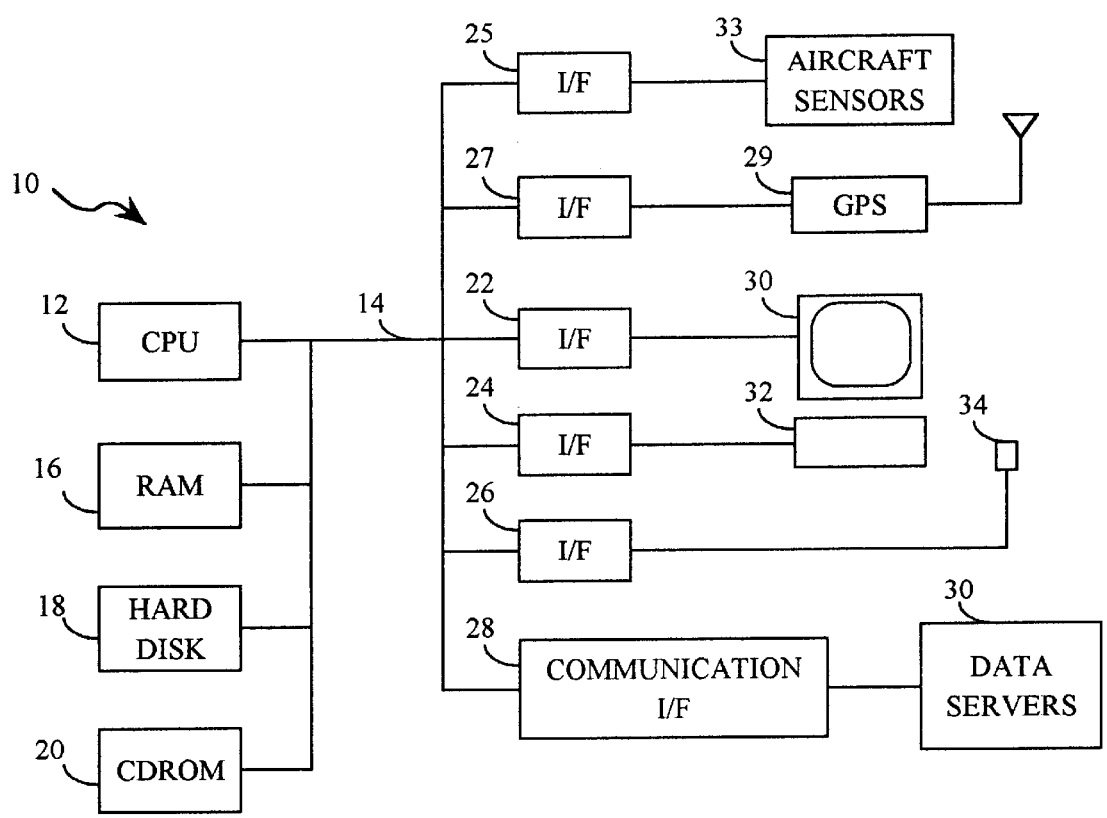
FIG. 1 depicts a computer system 10 according to an embodiment of the invention.

FIG. 1 depicts a computer system 10 according to an embodiment of the invention. The computer system includes a processor (CPU) 12 coupled to a bus 14. A memory including a RAM 16, a hard disk 18 and CD-ROM 20 is also coupled to the bus 14 and accessible by the processor. The memory is configured to store programs and data necessary for the invention, as described below. A number of interfaces 22, 24, 25, 26 are provided for coupling to a user interface. The user interface includes a display 30 a keyboard 32 and an input device 34. The input device 34 can be a mouse, touchscreen, joystick, flight pedals and yoke, or other conventional input device. A communications interface 28 is configured to communicate with other computer systems 36 such as those of the National Weather Service (NWS), Federal Aviation Administration (FAA), Internet, commercial vendors or other computers. The communications interface is designed to retrieve and translate information from these sources. Of course, additional or alternative computer elements can be employed, as known in the art.

In an in-flight system, an interface 27 is provided for a global positioning receiver (GPS) 29 in order to provide aircraft position information to the computer system 10. An interface 25 is created for any onboard aircraft sensors such as wind direction and speed, outside air temperature, aircraft attitude and air speed in order to further supplement navigation and weather information to the computer system 10. This type of real time position, aircraft and weather information can assist pilots and navigators in developing flight plans and deciding on alternate airports, if necessary.

Weather and air traffic data reside on a server and the information is sent to transmission stations for dissemination either via the Internet or another communications medium such as microwave or radio. In the in-flight system, the communication interface 28 may be a wireless interface that receives weather and air traffic updates from ground stations. As the aircraft moves through space, the computer uses GPS position updates to display the new x, y, z position of the aircraft in relation to the terrain, other air traffic, associated weather, and aviation data. As new weather and air traffic data are received, the computer system displays the aircraft and local traffic at the appropriate positions with the appropriate new surrounding weather conditions. The pilot can look ahead and behind as necessary to make flight decisions.

FIG. 2 depicts a memory 40 structure for storing program and data in the computer system 10 of FIG. 1. The memory 40 is divided into three primary components: a user interface system 42, database system 44 and communication system 46.

The user interface system 42 includes routines 48–52 for receiving information from the user and for providing information to the user. Initialization routine 48 provides a function that initializes the computer system 10 on power up and presents the user with a start-up display. A user input routine 50 is configured to receive commands from the user via the user interface and to conform the commands to applicable computer instructions. For example, if the user instructs the computer system 10 to display an alternate image, the user input element instructs the processor 12 to execute such a command. A user output routine 52 is configured to provide the user with an output from the computer system 10. For example, a display will provide the user with a selected alternate image. Moreover, the output routine can provide additional user stimulus such as force feedback or spatialized or nonspatialized auditory alarms to alert the pilot to certain conditions such as turbulence, icing, high velocity winds or an impending collision with terrain or another aircraft.

The database system 44 includes databases for storing the information related to the invention. FIGS. 3A–F depicts the database system in greater detail.

FIG. 3A depicts the terrain database 54 that stores data relating to the ground terrain. The database stores latitude, longitude and elevation for a predefined area. The area is broken into cells that represent the terrain. A number of cells are stored in the memory 16, 18 and 20 and additional cells can be added and updated via the CDROM 20 or communication interface 28.

FIG. 3B depicts the map database 56 that stores aviation map features. Airspace information is provided including: class A, B, C, D, E, G airspace locations and altitudes; prohibited airspace, restricted airspace, warning areas, military operation areas and alert areas locations, altitudes and times of active status; parachute jumping, ultralight, and glider area locations; and military training routes locations, altitudes and times of operation. Regarding obstacles, location and height information is important. Information about navigational aids' locations, frequencies and types is provided. Other aviation map features include airport location, hours of operation, runways with orientation length and type (e.g. asphalt, grass or other material), and traffic pattern information. NOTAM types L, D, and FDC are stored in the database depending on date/time in which they are in effect, location(s)/object(s) affected, and action upon the object(s) or amendment made. For instrument flight, specific information is important such as standard departures, standard terminal arrivals and instrument approaches including: landing patterns, published headings, altitudes, and fixes (and their locations), approach type, decision height (DH) or minimum decent altitude (MDA), aircraft category specific data (DHs, MDAs, minimum visibility and ceiling), required climb rates and decent profiles and times to final approach fix. These data may also be customized to reflect commercial operator specific minimums and requirements for landing, takeoff or alternate destinations. For pre-flight and in-flight planning, airway location is provided including names and intersections as well as landmark types, names, locations and elevations. This map database provides the pilot with information to make pre-flight and in-flight planning.

FIG. 3C depicts the weather database 58 that stores weather information based on latitude, longitude and altitude. Some of the weather characteristics are: surface observations; composite moisture stability data; wind shear reports and forecasts; icing forecasts; turbulence reports; pilot reports; constant pressure chart data; volcanic ash forecast and dispersion data; surface analysis data; radar summary data; significant weather prognostic data; and satellite imagery (e.g. GOES, NEXRAD). This database can be populated by any future reporting or forecasting data products and translated into designated shapes or icons and placed by geospecific coordinates in the 3D world display.

FIG. 3D depicts the aircraft database 60 that stores aircraft specific parameters for various aircraft. For each type of aircraft, various parameters are stored including: takeoff performance and distance for different configurations and departures; landing performance and ground roll for different configurations and arrival profiles; cross-wind limits; weight and balance; cruise speed; service ceiling; rate of climb; angle of climb; stall speed; engine out glide path, speed and distance; fuel capacity; gas consumption; and other parameters. This information assists the computer system 10 and the pilot in making pre-flight and in-flight planning. For example, by using the ground wind information from the weather database and the runway orientation from the map database, the computer can calculate the cross-wind component of the current wind for a particular runway and inform the pilot whether it is within the allowed parameters for the aircraft.

Figure 3E:
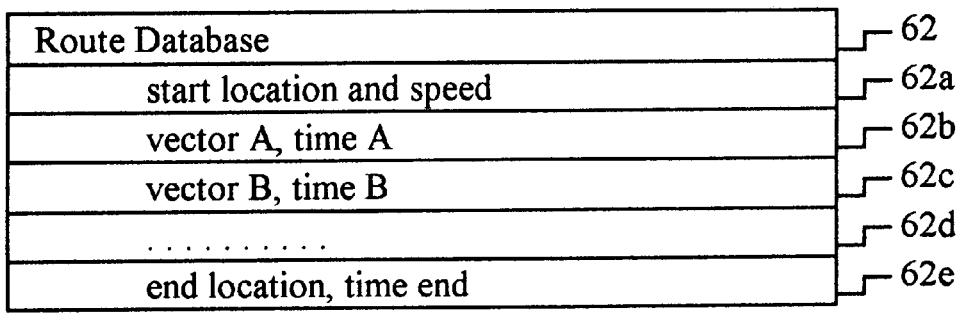

FIG. 3E depicts the route database 62 that stores information specified by the user including flight path information. This database is slightly different than the others because it is intended to be modified extensively by the user. For example, the user can input, retrieve and modify flight path parameters. Additionally, for in-flight use, the route and weather is modified by the GPS position information and aircraft sensors via interfaces 27 and 25.

Figure 3F:
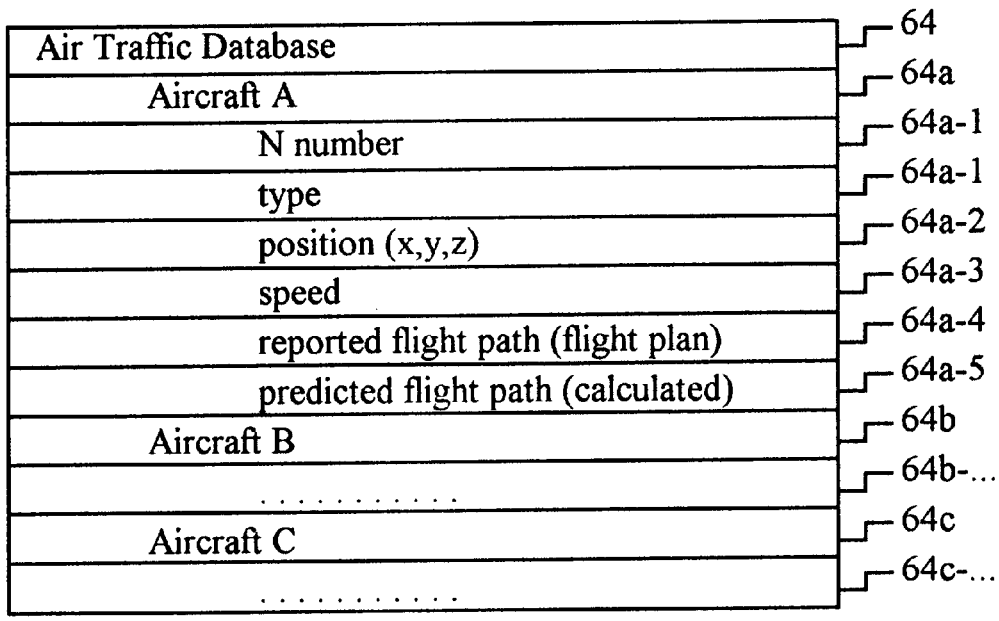

FIG. 3F depicts the traffic database that stores specific parameters associated with other aircraft flying in the area of the pilot. For each aircraft, various parameters such as position (x, y, z), speed, reported flight route and type of aircraft are stored. The information assists the computer system 10 and the pilot in displaying local air traffic conditions and allows prediction of flight paths from current position and speed parameters of other aircraft in the air traffic database and of the pilot's aircraft from the route database (GPS and planned route) to identify potential collisions.

Figure 4:
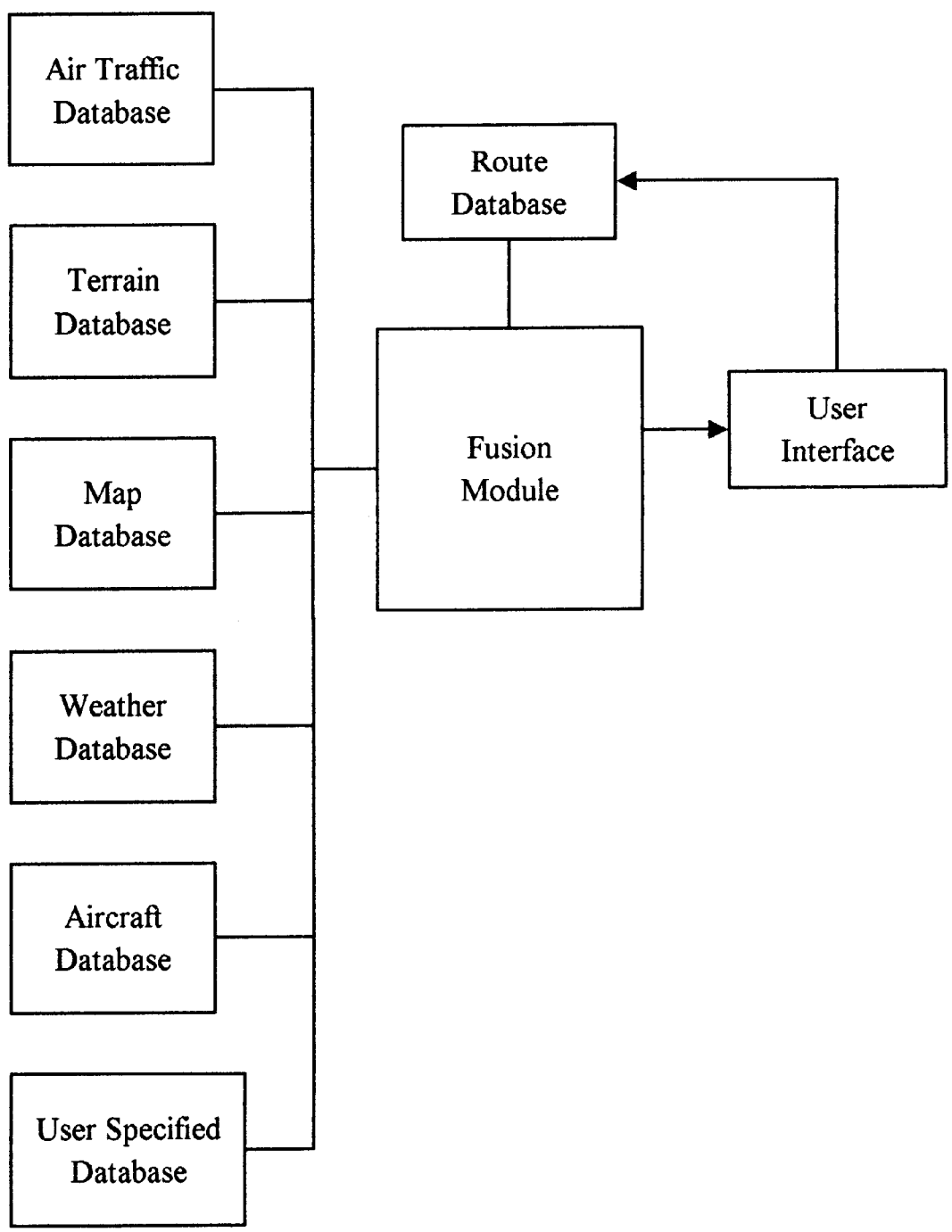
FIG. 4 is a functional block diagram according to an embodiment of the invention.

FIG. 4 is a functional block diagram according to an embodiment of the invention. A fusion module is employed to identify and retrieve information from the database system. In particular, the fusion module is coupled to the weather database, terrain database, the air traffic database, the aviation map database, the airplane specific database and the route database and configured to determine a position and heading of an airplane over the terrain based on the route database, to compute terrain information, weather information, air traffic information and aviation map information relative to the airplane and to compute and display flight parameters associated with the airplane using the airplane specific database.

Figure 5E:
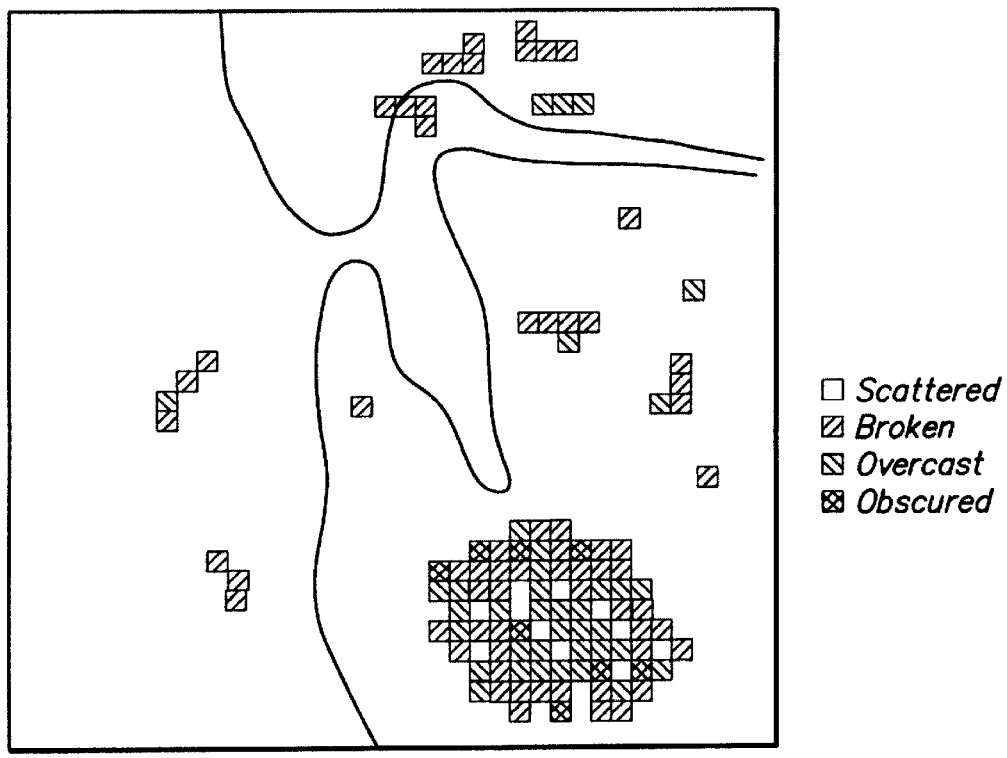

FIGS. 5A–H depict a user display interface according to an embodiment of the invention. FIG. 5A depicts a cockpit view while flying in the San Francisco bay area. San Francisco airport (SFO) is identified along with its runways and the barometric pressure 30.02. To the left of the display window 5A-1 is an information group 5A-2 providing information on the chosen airport (SFO) such as runway length and heading as well as airport latitude and longitude. Other airports such as Palo Alto (PAO) are identified along with their runway and barometric pressure information. An altitude indicator is provided along the left side of the display window 5A-1 and a heading indicator along to the top side of the display window 5A-1. The airports can be identified with attributes to indicate whether they are acceptable takeoff or landing sites for the aircraft (e.g. crosswind parameters within limits and runway length withing limits, etc). For example, runways are shaded with green overlay for distances calculated to be less than or equal to runway length minus 50 feet, shaded with yellow overlay for distances calculated to be greater than runway length minus 50 feet and less than or equal to runway length, and shaded with red for distances calculated to be greater than the runway length. Additionally, the length of the overlays correspond to the calculated takeoff/landing distances.

The display window 5A-1 is the 3D portion of a general user display containing data presented as a combination of 2D and 3D display techniques. The display is provided on the user's display 30, but can also be implemented through software running on a dedicated hardware device such as a personal computer (PC), or on a web page running on a PC. The user has control of all the display elements so any combination of parameters may be turned on or off. Three display profiles are created covering the takeoff, en route and landing or approach sequences of a flight for usability. Additionally, extensive use of an event trigger function, which allows an event to be triggered when the cursor is over an object, allows the user to selectively drill down on information on the 2D or 3D display by providing supplemental textual information right at the cursor or in a text box in the display window 5A-1.

Within the display window 5A-1 is the terrain information such as mountains and water. Adjacent to the display window is weather information 5A-3 such as visibility, dew-point spread, a ball bearing-like representation of temperature and wind, and other information. This weather information can also be overlaid on the display window 5A-1 or an icon can be provided to open and close the weather information.

FIG. 5B depicts a satellite view of the aircraft, terrain and weather conditions. As shown, the aircraft is heading toward a group of clouds that are identified as gray areas. These clouds can be displayed by altitude, water density, etc. by methods inherent to the imaging system used (e.g. NEXRAD, GOES-9) such as color-coding the cloud in proportion to water content (e.g. NEXRAD) or other similar technique (see FIG. 5E for a specific example of a NEXRAD image).

FIG. 5C depicts the ball bearing-like representation of temperature, wind and pressure. Each small circle presented around the circumference represents temperature or pressure at the designated altitude. The center ball is the closest reported temperature to the user's position in the 3D environment and can be interpolated between the two closest values. The line from the center of the circle pointing outward (like the hand of a clock) shows the aircraft altitude in the 3D environment (also represented on left border of the window 5A-1). The balls are filled with color in proportion to the magnitude of the temperature or pressure (a red ball representing a temperature such as 80 degrees Celsius) and the color will travel through a gradation of blue, green, yellow, and red (red being the hottest). Also in the center or on the periphery will be the time that the readings are valid expressed in the units of fractional hours from present time.

The format for wind is similar, except the balls are replaced with the 3D arrows. This graphic is displayed within the 3D environment (and its position adjustable) because the face is preferably presented to the user while the arrows remained fixed in orientation to show the wind's direction relative to the user's position in 3D space. As above, a space near the center arrow also has the time that the readings are valid expressed in the units of fractional hours from present time. This wind designator alternatively may be positioned in the 2D portion of the display and the arrows positioned such that they display wind relative to the pilot's aircraft as if one was looking down from above the aircraft (i.e. bird's eye view).

Figure 5F:
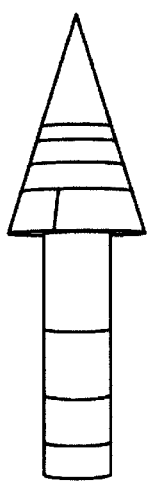
Figure 5G:
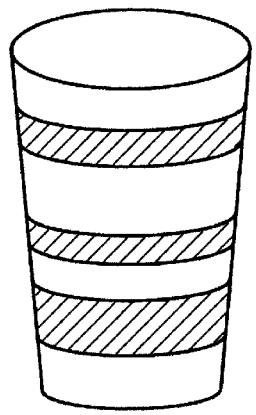
Figure 5H:
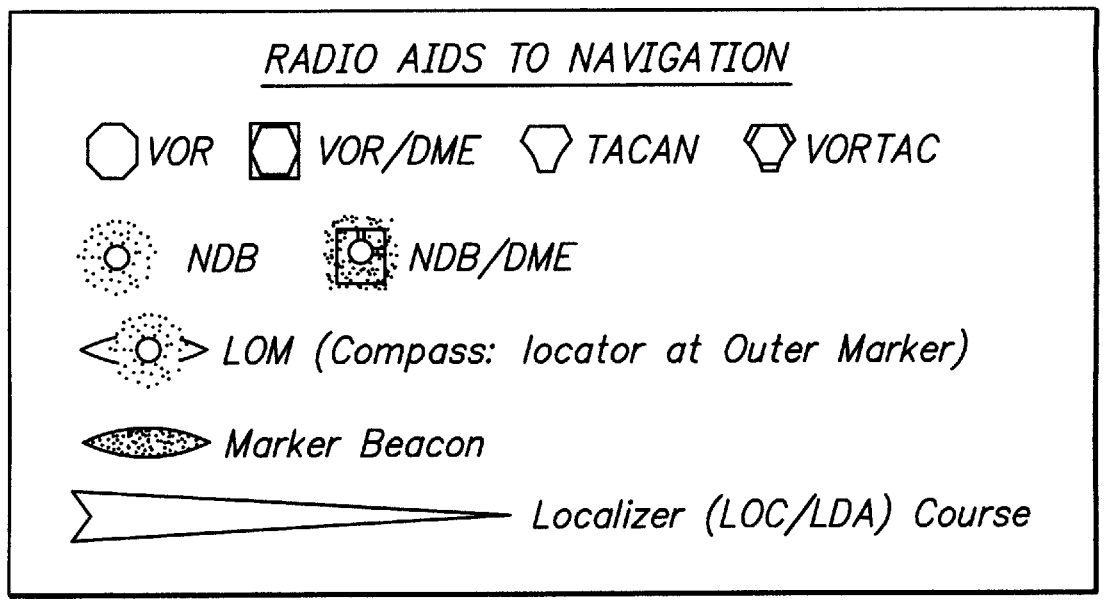

FIG. 5D depicts a cloud coverage legend that describes the degree of cloud coverage to the user. These symbols appear in the 3D world at their reported site adjacent to altitude values specifying ceiling elevations. FIG. 5E is an enlargement of one of the types of displays shown in FIG. 5B which depicts a NEXRAD weather image to assist the user in identifying local weather conditions. FIG. 5F depicts an icon used to express wind conditions at the surface and can be used in the ball bearing representation. FIG. 5G depicts a representation of clouds near a reporting station. For each of the designated altitudes, the cloud bases are represented by a semitransparent disk at the reported altitude and accompanied by a cloud coverage symbol for each layer. FIG. 5H is a legend that provides information about the radio aids to navigation. These are represented as 3D shapes in the 3D environment with cross sections which are similar in appearance to the symbols in the legend. Since the radio aids are displayed in the display window 5A-1, the user can pop-up legends such as that of FIG. 5H to ascertain the meaning of various map indicia.

Figure 6:
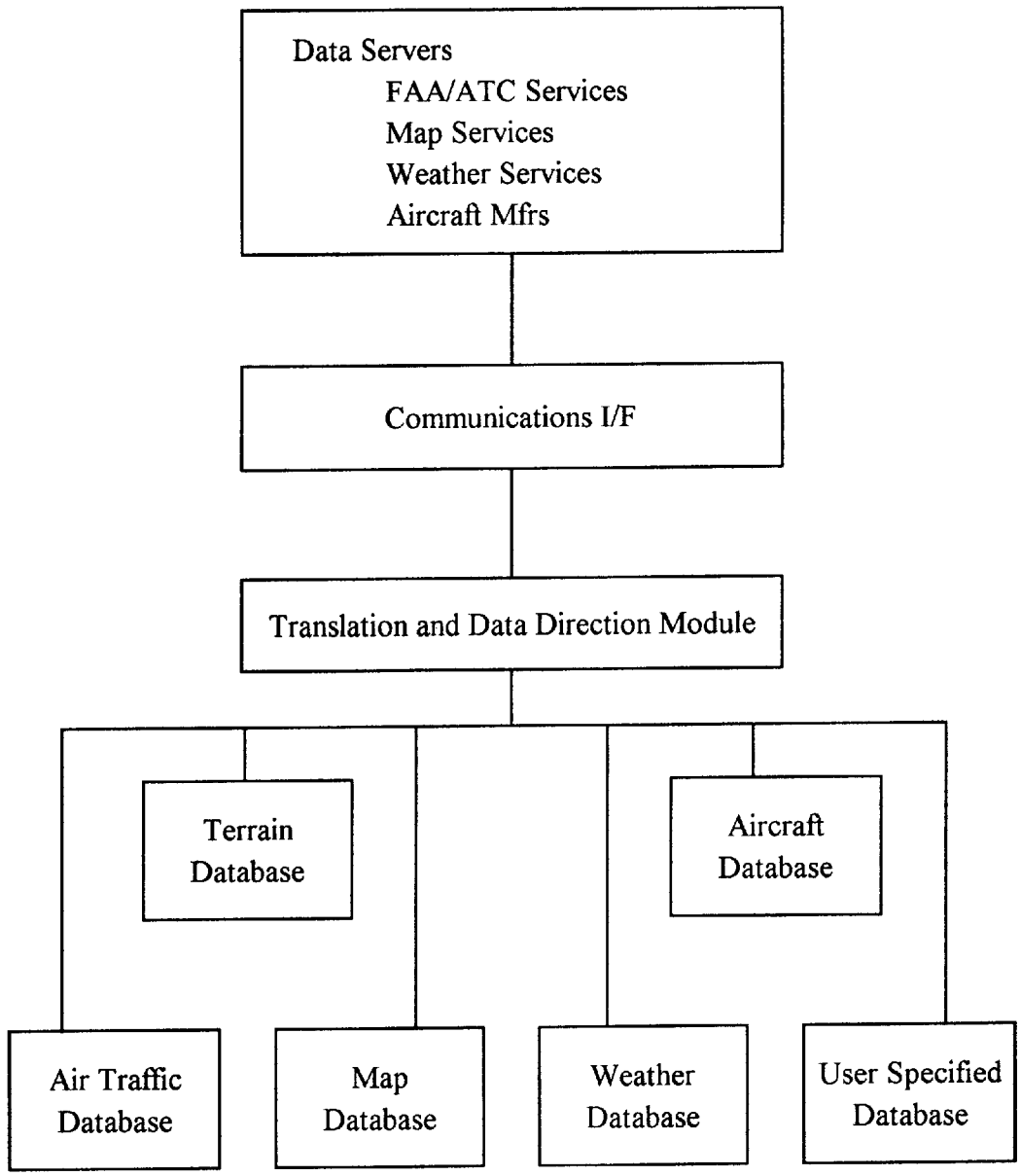
FIG. 6 depicts an aspect of the invention for retrieving and updating the database system.

FIG. 6 depicts an aspect of the invention for retrieving and updating the database system. The communication system is important since much of the information used in the database is periodically updated. For example, terrain data is updated when a new building is raised, map data is updated when a new airspace type is added or modified and airplane specific data is updated when new airplanes are specified. This type of information can be updated weekly or daily. However, some of the information is much more time-critical, such as weather data, certain types of notice data (e.g. NOTAMs) and air traffic data. For example, weather data is updated when fog builds on the coast or a weather front passes through an area, NOTAMs are updated whenever an important notice is posted by the FAA and air traffic data is updated continuously.

The terrain data, map data and airplane specific data updates can be performed periodically (e.g. weekly or daily), however, weather data is critical and must be updated very often, such as hourly or less, NOTAM data must be updated whenever an important notice is posted and air traffic data must be updated continuously. While most of the updates can be translated into the specific database format as needed and the data formats can be re-engineered periodically, weather data, NOTAM data and air traffic data must be accepted in data formats that are available and that become available. For these reasons, weather data receipt and conversion, NOTAM data receipt and conversion and air traffic receipt and conversion are described here in detail.

FIG. 7 depicts the weather data receipt and conversion module. The National Weather Service (NWS), National Oceanic and Atmospheric Administration (NOAA) and Federal Aviation Administration (FAA) issue weather related reports and these reports are available by connecting to a computer network. There are several types of reports available including hourly and special weather observation reports, terminal aerodrome forecasts, automated or manual surface observations (METARs), aviation area forecasts, winds aloft reports, radar reports, pilot reports, severe weather forecasts, AIRMETS, SIGMETS, and others. These reports identify the type of report, the report location, the time of the report and the weather. Often the weather is a weather string that includes a large amount of cryptic information such as BKN for broken clouds and OVC for overcast clouds. A translation module takes the reports and converts them to data that can be stored in the database. The translation module includes a list of all the cryptic information and a conversion routine that performs the translation.

FIG. 8 depicts the notice data receipt and conversion module. Notice data is also updated, although not as often, but this information is important to navigation and safe flying procedures. This data must also be accepted in data formats that are available and that become available. For these reasons, NOTAM data receipt and conversion is described here in detail. NOTAM types L, D, and FDC are handled using a different translation module. Many of these reports are associated with airports, navaids, airspaces etc. and can be identified in the 3D environment by a tag such as the letters "NOTAM" or the letter "N" floating near such objects. A mouse-over action on any of these tagged objects or the tag will produce a textual display of the NOTAM in a 2D window. Information which can readily be displayed in the 3D environment ("passed through") will be implemented at the valid date and time of the NOTAM. There is no action necessary to display this type of NOTAM as it is part of the display. An example of this would be a runway closure. As runways are already modeled in the 3D world, a red "X" over the runway would indicate closure, and no additional notation or mouse actions need be performed. Because NOTAMs must be accepted in data formats which are available and become available, the following is a more detailed account of the translation module implementation. Valid dates, times and locations of the NOTAMS will be parsed initially. If these occur in the area and during the time of the proposed or actual flight, they are labeled as active, otherwise they are stored in the database with a flag to become active at the valid time and date. Navaids, airports, runways, taxiways, lighting aids and obstructions in the 3D world will be tagged with an icon denoting a NOTAM is in effect for that object. Clicking on the object would show the NOTAM effects (if not already implemented in the 3D world) and give a textual display simultaneously in a 2D text box. For example, if a navaid had an unusable section of its service area from one altitude to another, this would be displayed as a red floating wedge in the area affected after clicking on the tagged object. If a runway lighting system is out of service, clicking on the NOTAM tag or the runway associated with the tag would trigger a pop up window displaying a 2D graphic of the lighting system with red Xs on it. If parachuting or demonstration aircraft are to be in a specific vicinity as reported by a NOTAM, clicking on the NOTAM tag or associated airport will display a semitransparent cylinder with an associated parachute or aircraft icon marking the area of involvement. Certain NOTAMs are passed through to the 3D world for direct implementation without the user having to prompt the display. These include NOTAMs for navaids out of service (a red "X" on the 3D object representing the navaid), obstructions in or around the airport vicinity (an obstruction icon would be drawn directly into the 3D environment at its location) or changes in approach/departure or alternate minimums (shown directly when the pilot calls for approach/departure paths to be displayed).

Once the information has been stored in the weather database (for weather data) or map database (for NOTAM data), the invention can display the weather or NOTAM changes on the display in the user interface. In this manner, the user can visually see the weather conditions or NOTAM changes along a predetermined route or any route of their choosing and at one or more destination airports.

Figure 5I:
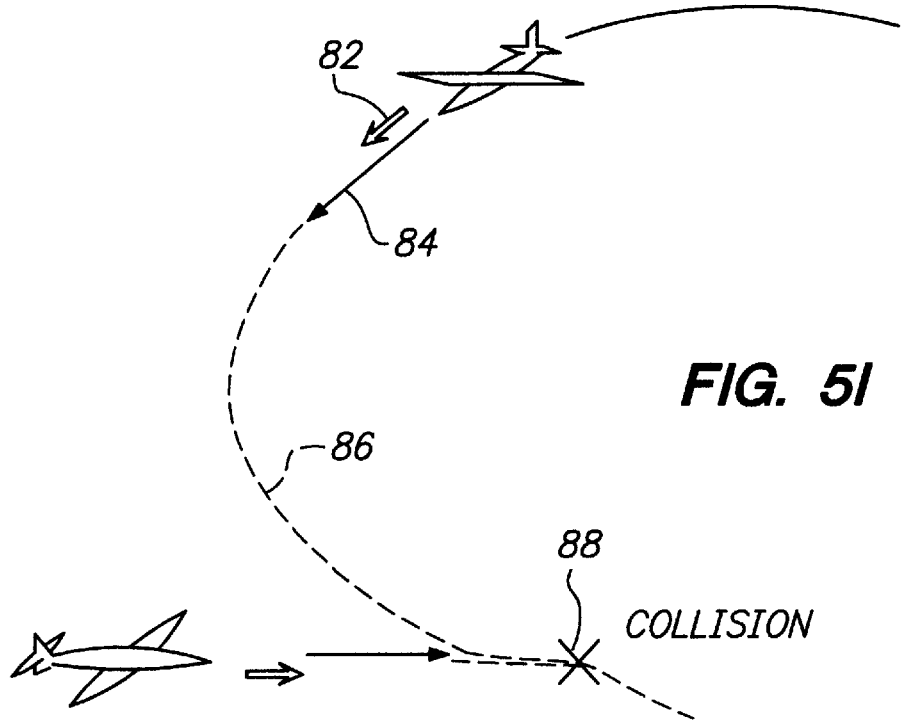
Figure 9:
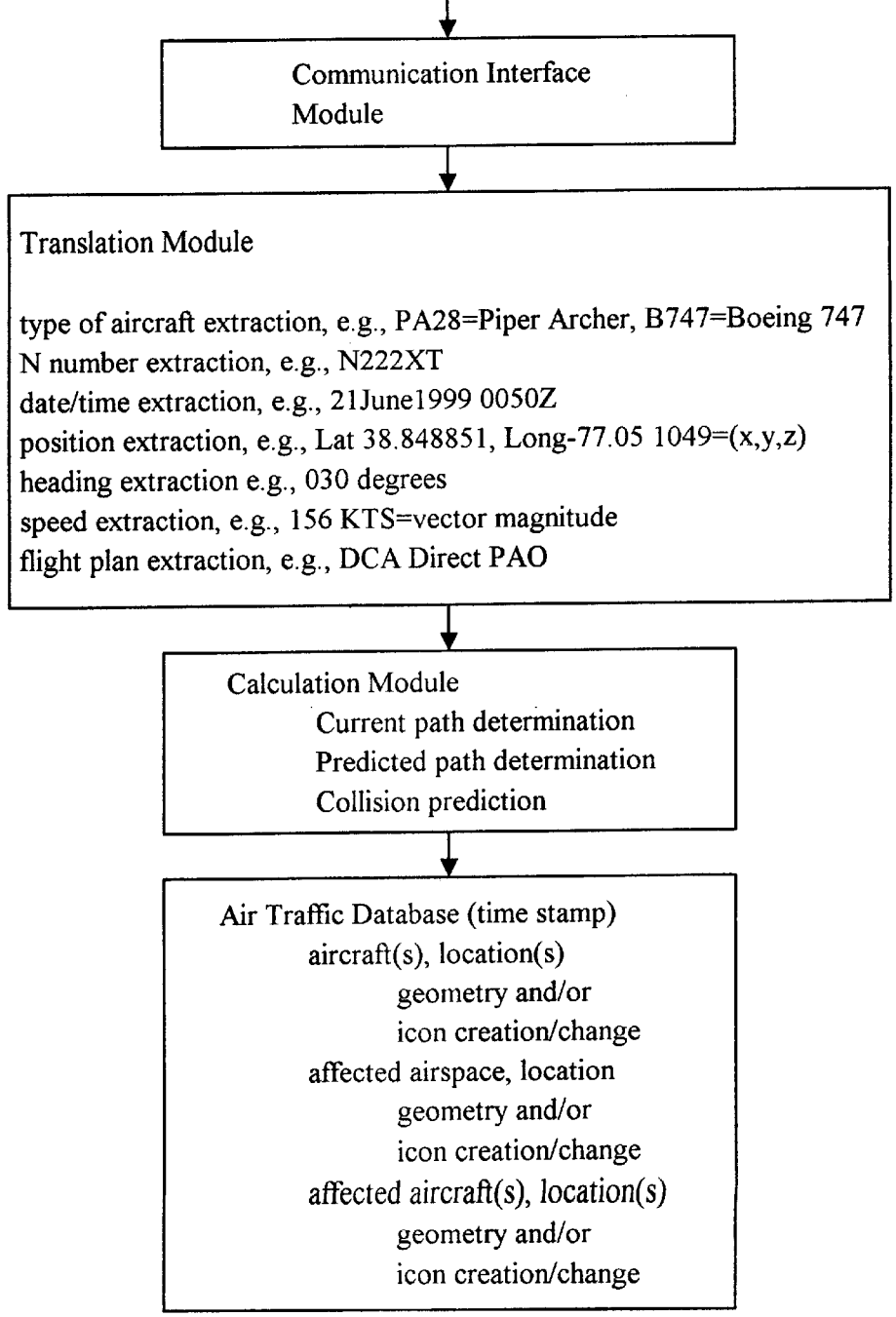
FIG. 9 depicts an aspect of the invention for retrieving and updating the air traffic database.

*FIG. 9 depicts the air traffic data receipt and conversion module. The communication system is important because most of the information used in the database is updated regularly at short intervals. For these reasons, air traffic data receipt and conversion is described here in detail. Information available from the FAA Radar, Air Route Traffic Control Center (ARTCC), and the Air Route Traffic Control Command Center (ARTCCC) databases of current IFR or other monitored aircraft include the aircraft type, aircraft N number, date and time of data capture, aircraft global position, aircraft speed, aircraft heading, aircraft flight plan and flight plan modifications or transient deviations for events such as weather. These data are captured, parsed and translated into a format enabling population of the air traffic database as, shown in FIG. 9. A calculation module determines the current and future paths of each aircraft using position, heading and flight plan information, and the database will be updated accordingly. As each aircraft is tracked, a user toggled feature will allow tracing of other aircrafts' path through 3D space in the virtual world display. An arrow emanating from each aircraft depicts the immediate direction and position in the next several seconds, as shown by FIG. 5I arrow 82. Heading and speed information can be displayed either through a toggle feature or a mouse-over gesture. Using both this information and flight plan and speed data, predicted paths can be drawn from any aircraft and a collision algorithm can determine any path intersections to occur, as shown by FIG. 5I arrow 84. Users may toggle on an immediate predicted path function represented by a different colored arrow or different color and/or thickness pathway line drawn up to a minute in the future, or they may select collision detection of pathways extrapolated up to 30 minutes into the future. By accounting for speed, position, heading and flight plan, potential path collisions can be identified and affected pathways can be highlighted or displayed by a flashing pattern, as shown by FIG. 5I path 86. A prominent icon 88 at the anticipated collision point can also be displayed. In this manner, the system provides important information to insure that the pilot has enhanced situational awareness of the immediate and potential air traffic conflicts within the route of flight.

Advantages of the invention include the ability to supply a pilot with an enhanced situational awareness through data display in visual or other formats so that he can visualize and analyze his flight and approach to the destination airport. This provides improved information to the pilot so that he can quickly and more easily make his decision whether to make to flight or to make an approach or takeoff. With this improved information, the pilot will make safe and informed decisions about flying.

Having disclosed exemplary embodiments and the best mode, modifications and variations may be made to the disclosed embodiments while remaining within the scope of the invention as defined by the following claims.

What is claimed is:

1. A computer system for displaying terrain, weather and aviation information, comprising:
   a terrain database configured to store terrain information;
   an aviation map database configured to store aviation map information;
   a weather database configured to store weather information;
   an air traffic database configured to store air traffic information;
   an airplane specific database configured to store aireplane specific information;
   a route database configured to store route information;
   an input terminal adapted to receive real-time information from a plurality of sources to update the weather database and the air traffic database; and
   a processor coupled to said input terminal, said terrain database, said aviation map database, said weather database, said air traffic database, said airplane specific database and said route database and configured to determine a position and heading of an airplane over said terrain based on said route database, to compute terrain information, weather information and aviation map information relative to said airplane, to compute flight parameters associated with said airplane using said airplane specific database, and to display flight information in a three-dimensional format including iconic representations of terrain information, weather information and air traffic information.

2. The computer system of claim 1, further comprising:
   a fusion module coupled to said terrain database, said aviation map database, said weather database, said air traffic database, said airplane specific database and said route database and configured to transform data from a first format to a second format; and
   wherein said processor is configured to employ data in the second format to display flight information in a three-dimensional format including iconic representations of terrain information, weather information and air traffic information.

3. The computer system of claim 2, wherein:
   said processor is configured to actively model and display customized three dimensional icons that are superimposed geospecifically upon a user selectable three dimensional moving terrain map.

4. The computer system of claim 1, wherein:
   said processor is configured to actively model and display customized three dimensional icons that are superimposed geospecifically upon a user selectable three dimensional moving terrain map.

5. The computer system of claim 1, wherein:
   said airplane specific database includes runway length requirements, maximum crosswind component, fuel consumption, maximum climb speed, service ceiling, weight and balance parameters and object clearance.

6. The computer system of claim 1, wherein said air traffic database includes aircraft type, speed, direction, altitude, reported flight plan and predicted position and speed.

7. The computer system of claim 1, wherein:

the air traffic database includes a first database having a first format and a second database having a second format;

said input terminal is adapted to receive air traffic information in the first format; and said processor is configured to:

(a) associate keywords in the first format with keywords in the second format;

(b) identify locations, speeds, and directions in the first format and convert the locations to latitude and longitude, speeds to knots, directions into degrees of azimuth, planned routes into vectors; and (c) store the keywords in the second format and locations, speeds, directions and planned routes in the second database in the second format.

8. The computer system of claim 7, further comprising:

a fusion module coupled to said terrain database, said aviation map database, said weather database, said air traffic database, said airplane specific database and said route database and configured to transform data from a first format to a second format; and wherein said processor is configured to employ data in the second format to display flight information in a three-dimensional format including iconic representations of terrain information, weather information and air traffic information.

9. The computer system of claim 8, wherein:

said processor is configured to actively model and display customized three dimensional icons that are superimposed geospecifically upon a user selectable three dimensional moving terrain map.

10. The computer system of claim 7, wherein:

said processor is configured to actively model and display customized three dimensional icons that are superimposed geospecifically upon a user selectable three dimensional moving terrain map.

11. The computer system of claim 7, wherein:

said airplane specific database includes runway length requirements, maximum crosswind component, fuel consumption, maximum climb speed, service ceiling, weight and balance parameters and object clearance.

12. The computer system of claim 7, wherein said air traffic database includes aircraft type, speed, direction, altitude, reported flight plan and predicted position and speed.

13. A method of displaying terrain, weather and aviation information related to an aircraft in response to a user's input, comprising the steps of:

receiving the user's input including location information;

identifying a location of the aircraft;

retrieving terrain data from a terrain database;

retrieving map data from an aviation map database;

retrieving weather data from a weather database;

retrieving airplane specific data from an airplane specific database;

retrieving route data from a route database; and receiving real-time information from a plurality of sources to update the weather database and the air traffic database;

based on the user's input, determining a position and heading of an airplane over the terrain based on the route database;

computing terrain information, weather information and aviation map information relative to the airplane and computing and displaying flight parameters associated with the airplane using the airplane specific database; and displaying flight information in a three-dimensional format including iconic representations of terrain information, weather information and air traffic information.

14. The method of claim 13 for further displaying air traffic information, further comprising the steps of:

retrieving air traffic data from an air traffic database; and computing air traffic information relative to the airplane and computing and displaying flight parameters associated with the airplane using the airplane specific database.

15. A method of translating air traffic information from a first database having a first format and converting the air traffic information to a second database having a second format, said method comprising the steps of:

receiving air traffic information from the first database in the first format; associating keywords in the first format with keywords in the second format;

identifying locations, speeds, and directions in the first format and converting the locations to latitude and longitude, speeds to knots, directions into degrees of azimuth, planned routes into vectors; and storing the keywords in the second format and locations, speeds, directions and planned routes in the second database in the second format.

* * * * *